March 28, 1967 L. D. KESLAR ETAL 3,311,517
METHOD OF LAMINATING TRANSPARENT ASSEMBLIES
Filed June 13, 1963 2 Sheets-Sheet 1

INVENTORS
BY LEROY D. KESLAR and
JOHN S. RANKIN

Oscar L Spencer
ATTORNEY

March 28, 1967 L. D. KESLAR ETAL 3,311,517
METHOD OF LAMINATING TRANSPARENT ASSEMBLIES
Filed June 13, 1963 2 Sheets-Sheet 2

INVENTORS
LEROY D. KESLAR and
JOHN S. RANKIN
BY Oscar L. Spencer
ATTORNEY

United States Patent Office 3,311,517
Patented Mar. 28, 1967

3,311,517
METHOD OF LAMINATING TRANSPARENT ASSEMBLIES
Leroy D. Keslar, Natrona Heights, and John S. Rankin, Belle Vernon, Pa., assignors to Pittsburgh Plate Glass Company, Pittsburgh, Pa., a corporation of Pennsylvania
Filed June 13, 1963, Ser. No. 287,632
6 Claims. (Cl. 156—104)

This application is a continuation-in-part of application Serial No. 214,360, filed August 2, 1962, and now Patent No. 3,255,567 for Method and Apparatus for Treating Multiply Assemblies, and particularly relates to packaging laminated aircraft glazing closures such as laminated glass assemblies and the like within a laminated bag that is capable of being effectively evacuated and sealed, is sufficiently flexible to conform without substantial stretching to the contour of the assembly inserted therein for lamination in an autoclave. The bag comprises an inner ply of a flexible heat-sealable material capable of conforming intimately to the outline of the assembly and provided with evacuation passageways in its interior surface facing the major surfaces of the assembly and a thin flexible outer ply of a material adherent to said inner ply and capable of providing an oil-resistant barrier for the assembly at elevated temperatures and pressures.

The invention covered in our parent application Ser. No. 214,360 provides an automatic means for evacuating and heat sealing a bag that encloses a multiply glass-plastic assembly during lamination in an autoclave to produce an aircraft glazing unit.

The present invention preferably employs a bag comprising walls, each of a thin, outer layer of oil-resistant material that does not cut easily, is flexible for easy bending on application of a bending force, yet sufficiently rigid to withstand deformation on applying an overall pressure in the direction of its thickness, and an inner layer of a heat-sealable material having an embossed inner surface to encapsulate an assembly to be fabricated into a laminated glazing assembly for aircraft. Preferably, the total thickness of the bag does not exceed .005 inch and the outer ply is preferably about .001 inch thick. This maximum thickness is dictated by the necessity for the bag to conform quite intimately with the shape of the assembly to be subjected to autoclave treatment. Thicker bags do not conform in as intimate a manner as desired. The thickness of the outer ply or layer must be sufficient to protect the inner ply and the enclosed assembly from oil damage during autoclaving.

Autoclave operations may involve a treatment of up to 30 minutes or more at temperatures of about 190 to 325 degrees Fahrenheit, preferably about 225 to 300 degrees Fahrenheit, and simultaneous pressures of between 100 and 250 pounds per square inch, and preferably between about 175 to 225 pounds per square inch, depending on the thickness of the components of the assembly to be laminated and the number of interfaces between the components.

Assemblies utilizing the laminated bag of the present invention are usually composed of one or more interlayers of plasticized polyvinyl butyral or a transparent polyester siloxane elastomer specially compounded for use in aircraft glazing units, such as "type K" silicone sold by the Dow-Corning Corporation of Midland, Mich., to be laminated between relatively rigid sheets of transparent material such as various glasses, including plate glass, sheet glass, heat absorbing glass and various synthetic plastic materials such as polymethyl methacrylate; a diallyl diglycol carbonate polymer sold under the name CR-39 by the Cast Optics Company, Hackensack, N.J.; a methyl-a-chloroacrylate polymer sold under the name of "Gafite" by the General Aniline and Film Corporation, New York, N.Y.; various acrylics sold under the names "plex II," "Plex 55," and "Polymer K," made by Rohm and Haas, Philadelphia, Pa.; various polyesters such as "Sierracin" made by the Sierracin Corporation, Burbank, Calif.; the polystyrenes; and others.

Aircraft laminates are characterized by having their relatively flexible interlayer or interlayers extend beyond the margin of the relatively rigid sheets. The interlayer material, particularly polyvinyl butyral, is capable of being readily distorted and otherwise damaged if exposed directly to the hot, pressurized oil in the autoclave. Hence, it is necessary that the bag encapsulating the package containing the assembly must be capable of reinforcing the structural rigidity of the package enclosed therein to such an extent that while the filled bag is subjected to a uniform pressure it does not change its shape, even though its flexibility permits it to conform readily to the shape of the enclosed assembly when a differential pressure is applied.

Bags comprising an outer ply of "Mylar' (polyethylene glycol terephthalate) and an inner ply of polyethylene bonded thereto have been used as covers for sterile packages. In addition, the heat-shrinkable property of Mylar that is stretch formed has been employed to produce plastic bags for encasing food products such as poultry in intimate contact with the contents by immersing a closed bag loosely surrounding its contents within a bath of boiling water until the bag shrinks into intimate contact with its contents.

The above prior art teachings suggest that thin laminates of Mylar and polyethylene serve as good packaging materials for ordinary shelf items, but indicate that Mylar would not be a suitable outer layer for laminated packaging material for assemblies to be subjected to autoclave conditions, particularly when those assemblies contain an extrudable material susceptible of deformation under autoclaving conditions, because the heat-shrinking property of Mylar would be likely to misshape the plastic interlayer of the assembly undergoing lamination in the autoclave, particularly in the marginal edge extension portion.

The present invention is based on the discovery of a smooth, unstretched laminated packaging material comprising a thin outer ply of an oil-resistant material and an inner ply of heat-sealable material employed as a bag to encapsulate an assembly for lamination in an autoclave. The smooth, unstretched material is sufficiently free from heat shrinkage under autoclave conditions to avoid distorting the marginal extension of the interlayer material. This discovery has enabled assemblies to be laminated while sealed within a bag of such laminated material while subjected to autoclave conditions without distorting the thermoplastic components of the assembly to be laminated, despite the prior art indications of possible distortion thereof due to heat shrinkage.

The bag is sealed on three sides and its access opening rests on an electric heating element. The heating element rests on the lower jaw of a pair of jaws provided with gasket means forming a sealed chamber surrounding the access opening of the bag. Evacuation means comprising an evacuation pipe communicates with the sealed chamber through an opening in the lower jaw to evacuate air and other gases entrapped within the flexible bag. The embossing on the interior surfaces of the polyethylene inner layer of the bag provides passages to enhance the escape of the entrapped gases from within the flexible bag.

A pressure actuated switch is contained within the evacuation pipe. When the pressure within the bag and the sealed chamber surrounding the access opening to the bag is reduced below a predetermined value, the pressure actuated switch responds to actuate a timer circuit. The latter actuates a voltage supply source electrically connected to the electric heating element after a predetermined time delay during which time the vacuum source continues to operate to evacuate the thin flexible bag. The electric heating element is a thin flat strip of nichrome wire having the characteristic of heating to a temperature sufficient to seal the polyethylene inner walls of the access opening of the bag in a very short time, on the order of 3 to 6 seconds. The timer circuit also includes means for disconnecting the voltage supply source after the electric heating element has been heated for sufficient time to insure that the access opening of the thin flexible bag is heat sealed.

In order to insure that the heating element is not wrinkled, thereby wrinkling the bag in the region of its access opening, springs or other tensioning means are attached to the extremities of the electrical heating element in order to maintain the latter in tension. This tension force keeps the electric heating element flat and does not permit it to wrinkle even though the electric heating element expands due to thermal expansion when it is energized.

A typical illustrative embodiment of the present invention will now be described to provide a complete understanding thereof.

In the drawings which form part of the present disclosure and wherein like reference numerals are applied to like structural elements, FIG. 1 is a plan view of a bag showing a multiply assembly inserted therein;

Figure 1:
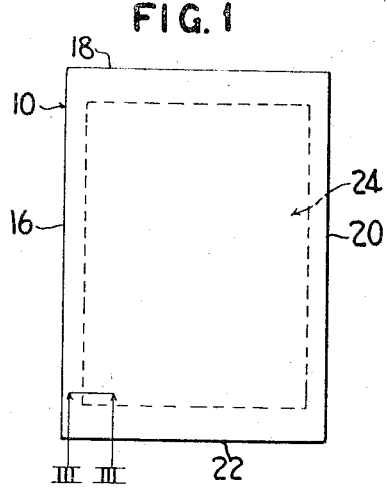
Figure 2:
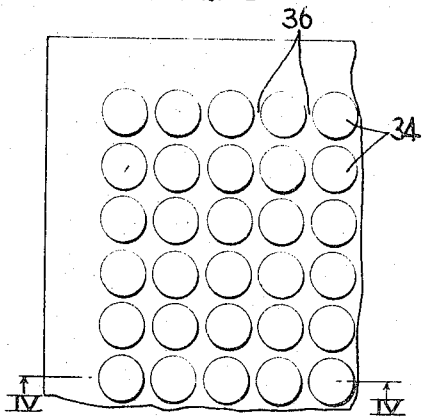
FIG. 2 is an enlarged fragmentary view of an inner surface of a wall of the bag of FIG. 1.

The drawings show a thin, flexible bag 10 of substantially rectangular outline. The bag is formed of an upper wall 11 and lower wall 12, each of heat-sealable material. Each wall of the illustrated embodiment comprises an outer ply 13 of polyethylene glycol terephthalate, commonly known as Mylar, and an inner ply 14 of polyethylene having a preferred density range of between .916 and .93 bonded thereto. The inner ply 14 of the lower wall of the bag 10 is sealed to the inner ply 14 of the upper wall of the bag 10 along the complete length of three marginal borders 16, 18, and 20 leaving an access opening 22 along the fourth marginal edge of the bag. The outer surface of the outer ply 13 is preferably smooth.

Figure 3:
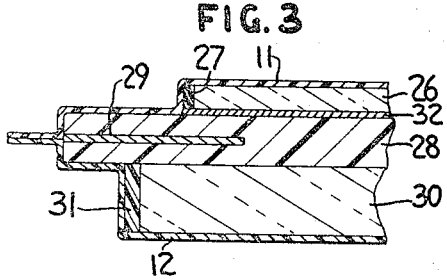
FIG. 3 is a fragmentary enlarged cross-section of a portion of the bag through a portion of an assembly inserted therein, and taken along the lines III—III of FIG. 1.
Figure 4:
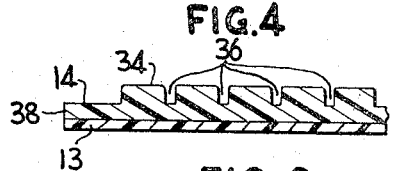
FIG. 4 is an enlarged fragmentary cross-sectional view of a wall of the bag of FIG. 1 taken along the lines IV—IV of FIG. 2.
Figure 5:
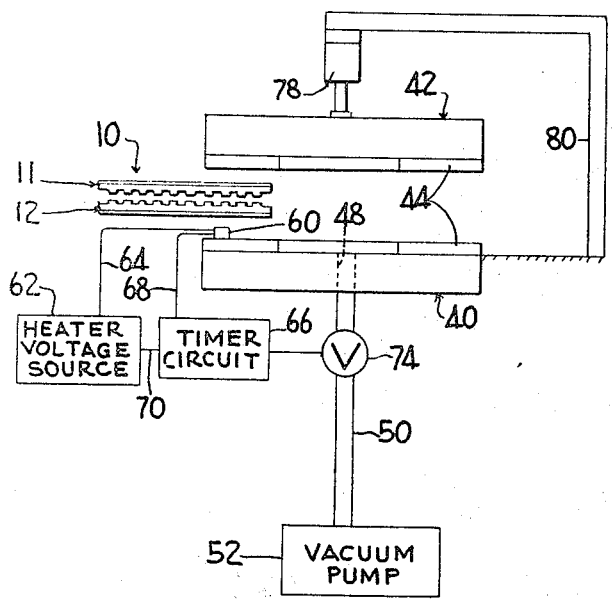
FIG. 5 is an exploded fragmentary sectional view of the evacuating and sealing means for use with the present invention including a schematic circuit diagram of an electrical control circuit which energizes an electrical resistance element which is part of the apparatus illustrated.

FIG. 3 shows a typical multiply assembly 24 within the bag 10. The assembly 24 is composed of a thin glass sheet 26 surrounded by a thin rubber frame 27, a plastic interlayer 28 of polyvinyl butyral reinforced with a metal insert 29 and a thick glass sheet 30 surrounded by a frame 31 of phenolic resin. The inner surface of the thin glass sheet 26 is covered with a thin transparent electroconductive coating 32 of tin oxide. The present disclosure will describe operating conditions for treating an assembly 48 inches by 36 inches in outline comprising glass sheets having a nominal thickness of 3/16 inch and ½ inch, respectively, and a plastic interlayer about ⅜ inch thick whose edge is located about ½ inch beyond the margin of the thicker sheet and about 1 inch beyond that of the thinner, coated sheet.

Each inner ply 14 of polyethylene is embossed along its inner surface to form a checkerboard pattern of rounded protuberances 34 on the inner surface thereof. In a typical construction, the Mylar outer ply 13 is about .001 inch thick and the polyethylene inner ply is about .0035 inch thick. Each protuberance is about .030 inch in diameter with grooves 36 providing a minimum space between adjacent protuberances of about .005 inch. The minimum depth of the grooves between protuberances is about .002 inch, leaving a base 38 for the inner ply 14 about .0015 inch thick. Grooves 36 provide a plurality of passageways for the escape of gas entrapped within the bag 10 in about 6 seconds when the latter is evacuated at a vacuum of 27 inches of mercury.

Figure 8:
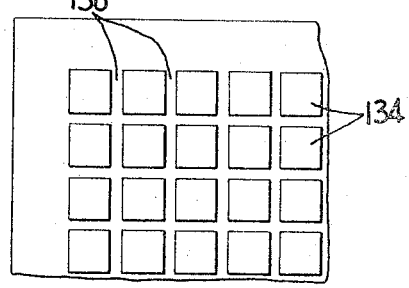
FIGS. 8 and 9 are views similar to that of FIG. 2 showing alternate embodiments of embossing capable of use with the present invention.
Figure 9:
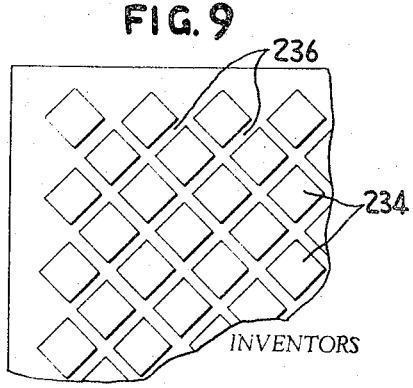
Figure 6:
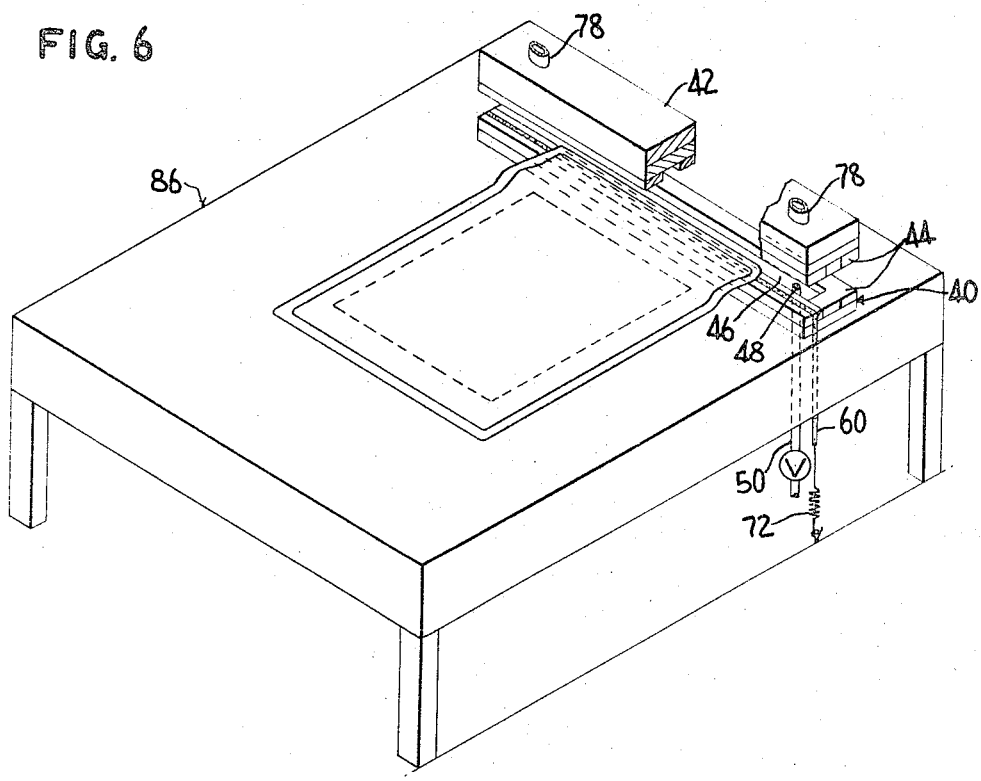
FIG. 6 is an isometric view of a preferred embodiment of the present invention illustrating the novel evacuating and sealing means used with the present invention in position to perform its function.

Typical alternative constructions of protuberances are square protuberances 134 about .030 inch by .030 inch and .002 inch thick separated by criss-crossing grooves 136 about .002 inch wide and .002 inch high arranged in checkerboard fashion as depicted in FIG. 8, and similar diamond-shaped protuberances 234 separated by grooves 236 as depicted in FIG. 9. The protuberances 34, 134 and 234 and grooves 36, 136 and 236 may be varied in size and orientation provided they provide a series of intersecting passages through which air entrapped between the walls of the bag and the assembly may be efficiently evacuated from the interior of the bag to the opening.

When the bag is evacuated, the pressure of the atmosphere acts uniformly upon the outer surfaces of the bag to conform the laminated bag to the outer surfaces of the assembly including the edge surfaces of the latter. The inner ply of polyethylene in the upper wall of the bag may be in contact with the inner ply of polyethylene in the lower wall of the bag, if the assembly inserted is smaller than the bag. The property of polyethylene to seal to itself when subjected to pressure enables the bag to conform intimately around the surface of the inserted assembly when the air within the bag is evacuated at room temperature. At this temperature and pressure, the polyethylene seals to itself and the polyvinyl butyral is not subject to substantial deformation. The opening of the evacuated bag is sealed and the closed bag conforming intimately to the outline of its contents is inserted in an autoclave where the conditions are such that the interlayer material of the enclosed assembly would be subject to deformation except for the fact that the laminated casing formed by the sealed bag resists this deformation when the pressure is applied uniformly over the entire surface of the bag.

The evacuating and sealing apparatus desirable for use with the present invention comprises a lower jaw 40 and an upper jaw 42. Each jaw is about 2¾ inches wide and 50 inches long. The lower surface of the upper jaw 42 and the upper surface of the lower jaw 40 are each provided with a frame 44 of gasket sealing strips of an air impervious material such as a silicone, neoprene, sponge rubber or the like. The sealing strips 44 enclose an elongated sealed chamber 46 communicating with the access opening 22 of the bag 10. In a typical embodiment, strips of closed cell sponge rubber ¾ inch wide and ⅛ inch thick having an A Shore durometer rating of 25 were used, with a range of 20 to 30 acceptable.

An aperture 48 is provided in the lower jaw 40 intermediate the sealing strips 44. An evacuation pipe 50 extends from the aperture 48 to an evacuation pump 52.

When the bag 10 is properly placed with its access opening 22 entirely within the sealed chamber 46, the evacuation pump 52 causes the removal of air and other gases from within the envelope 10 through the access opening 22, sealed chamber 46, aperture 48, and evacuation pipe 50 until the thin, flexible bag conforms to the shape of the assembly inserted therewithin.

At this time, the bag 10 is ready to be heat-sealed. Apparatus for heat-sealing the access opening comprises a nichrome ribbon electrical resistance element 60 connected to a voltage source 62 through a lead wire 64, to a timer circuit 66 through another lead wire 68 and through an additional lead wire 70 coupling the timer circuit 68 and the voltage source 62.

The electrical heating element 60 is stretched by attaching each end thereof to a tension spring 72 whose other end is attached to an insulated fixture (not shown). This stretching keeps the electric heating element 60 flat even when it expands thermally when energized. If the element 60 were not stretched, it would tend to wrinkle and spoil the contour of the bag 10 at its critical region, its access opening 22.

The timer circuit 66 is coupled to a pressure actuated switch 74 located within the evacuation pipe 50. The switch 74 is constructed to respond to a predetermined pressure level in the evacuation pipe 50.

In a typical operation, when the pressure in the evacuation pipe is reduced to an evacuated state of about 27 inches of mercury below normal atmospheric pressure, switch 74 actuates the timer circuit 66. The latter in turn actuates the heater voltage source 62 after a delay of ten seconds. A number 34 nichrome ribbon ¼ inch wide, .012 inch thick, and 5 feet long used as electric heating element 60 was actuated for a period of 4 seconds using a voltage source 62 of 18 volts to provide a heat of about 200 watts per foot length of heating element. A suitable range for sealing the bag is 150 to 250 watts per foot length with the time of application ranging from 6 seconds to 3 seconds, respectively. More time is needed for a smaller power input than for a larger power input.

At the end of the heating cycle, the assembly 24 was completely sealed within the bag 10. The evacuation pump 52 was stopped and the upper jaw 42 raised from contact with the lower jaw 40. In order to facilitate lifting and lowering the upper jaw, a number of air cylinders 78 are supported on a support structure 80.

Figure 7:
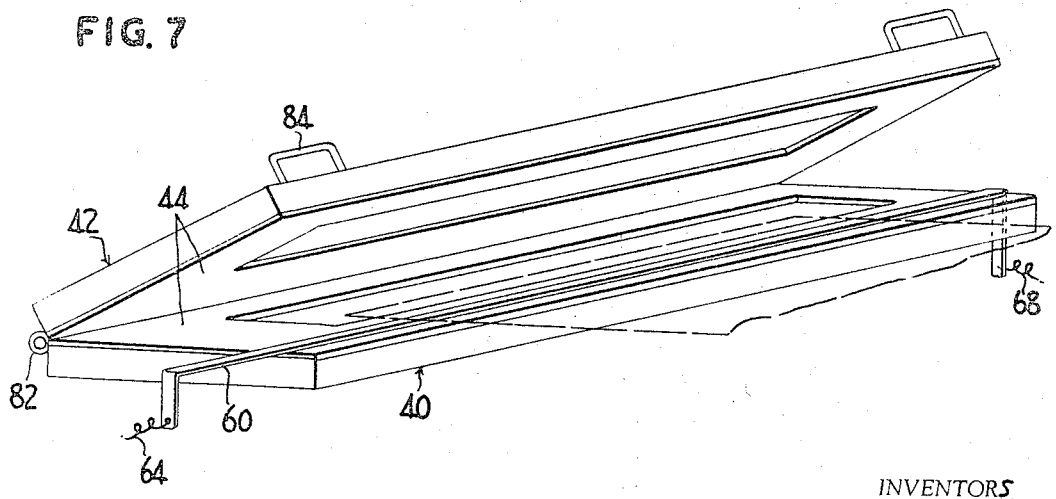
FIG. 7 is an isomtric view of an alternative embodiment of apparatus used with the present invention.

FIG. 7 shows an alternate embodiment of apparatus capable of use in conjunction with the invention in which the upper jaw 42 is pivoted to the lower jaw 40 about hinge means 82 at the outer end of the jaws. Handles 84 are attached to the upper wall of upper jaw 42 to facilitate its pivoting into an open position to receive a bag for loading, evacuation and sealing and for pivoting into a closed position to form the sealed chamber 46.

Either of the above embodiments may be mounted on a support table 86, the upper surface of which supports the bag in a horizontal plane.

The present invention suggests employing the following method to prepare multiply assemblies for lamination under heat and pressure. A sheet of laminated bag material is placed on a table with its embossed surface upward. The plies of the assembly are superimposed upon one another in their desired configuration and assembled over the embossed surface. The assembly rests within the outline of the sheet of bag material. An embossed surface of another sheet of bag material is placed face downward upon the upper ply of the assembly. Three marginal sides of the sheets extending beyond the assembly are heat-sealed to produce a bag having an access opening along its fourth side. A hot roller may be rolled along three marginal edges of the assembly in pressurized contact therewith outside the area of the assembly to be laminated to form the bag by pressing the inner polyethylene surfaces of the upper and lower walls together in this marginal region. As an alternative, the bag is first formed with an access opening by mounting the upper and lower walls with their embossed polyethylene surfaces facing one another and inserting the assembly within the bag through the access opening for evacuation and sealing.

A thin strip of electric resistance material is placed on a strip of gasket material surrounding the lower jaw. The bag is mounted above the lower jaw and the strip. The access opening of the bag is placed beyond the strip of electrical resistance material and in communication with the area surrounding by the gasket material. Air cylinders 78 are actuated to lower the upper jaw 42 into position wherein its frame of gasket material 44 is aligned with the frame of the lower jaw 40, thus forming the sealed chamber 46.

The bag is evacuated by evacuating the sealed chamber. When the pressure within the bag and its evacuating system reaches a vacuum of 27 inches of mercury, the timer circuit 66 is energized to cause the voltage source 62 to energize the electrical heater 60 after a time delay of 10 seconds. Evacuation of the bag continues during this time delay and during the subsequent heating operation (200 watts per inch for 4 seconds). At the end of this time, the assembly is sealed within the evacuated bag, the walls of the bag conform to the shape of the assembly and the bag and its contents are ready for lamination under heat and pressure in an autoclave.

It is sometimes necessary to wrap the assembly in cellophane or other flexible parting material having a thickness of about .0005 inch to prevent the polyethylene from adhering to some component of the assembly during its lamination in an autoclave. For products requiring further edgework after lamination, a polyethylene backed tape is wrapped around the edges of the unit before the latter is inserted within the bag. After autoclave pressing, the bag is cut off at the edges of the unit and is left adhered to the tape on the surfaces of the unit when it serves as a protective coating to prevent its becoming scratched during edging.

Other materials other than Mylar—polyethylene samples—have been used successfully as bags. Any material of sufficient thinness to conform readily to the shape of the assembled unit that offers adequate resistance to damage from handling and to the autoclave fluids is acceptable. A synthetic linear polyamide such as nylon film (for example, polyhexamethylene adipamide) laminated with an embossed inner coating of polyethylene has been used successfully as a bag material. However, the best material used to date is a Mylar-polyethylene laminate identified as 100M 52P EMB sold by the Continental Can Company. It is preferred that the polyethylene employed have a maximum specific gravity of 0.93. Denser polyethylene is difficult to seal to itself easily and to adhere to Mylar. A specific gravity of 0.916 is the minimum density attainable at the present writing.

The preferred bag material mentioned above has a smooth outer surface of Mylar and an embossed inner surface of polyethylene. Other laminates of Mylar and polyethylene having embossed inner surfaces that are available commercially are embossed throughout their laminated thickness including their outer surfaces. The embossed outer surfaces are likely to become snagged and torn during handling. The preferred bag material with smooth outer surfaces is less likely to be snagged and torn during handling by virtue of its smooth outer surface.

While the process and apparatus described above has particular utility in preparing glass-plastic assemblies for lamination, it is also suitable for preparing assemblies of other materials for lamination and has been employed in preparing transparent all-plastic units for lamination into plastic glazing closures.

The form of the invention shown and described herein represents an illustrative preferred embodiment and certain modifications thereof. It is understood that various

What is claimed is:

1. In a method of preparing and laminating transparent assemblies wherein a flexible plastic sheet of interlayer material capable of substantial distortion at elevated temperatures and pressure is sandwiched between rigid layers of transparent material and thereafter the assembly is laminated together in an oil autoclave at elevated temperatures and pressures, the improvement comprising mounting an assembly between upper and lower walls of a horizontally disposed bag consisting essentially of a laminated layer of oil and moisture resistant plastic material and an inner layer of a heat-sealable plastic material having inwardly directed protuberances providing passages therebetween, said walls having a thickness not exceeding .005 inch so as to conform intimately to the outline of the assembly, said bag produced by sealing said laminated material together along three sides outside the margin of said assembly to form walls of a bag with an access opening enclosing said assembly, evacuating the interior of said bag through said access opening while the outer walls of the bag are exposed to substantially normal temperature and pressure conditions to conform said bag to its enclosed assembly without substantially deforming the interlayer material, sealing said access opening while maintaining said bag evacuated, and exposing the sealed bag and its contents to an elevated temperature and pressure for a time sufficient to laminate said assembly, with said bag encapsulating said assembly in such intimate contact that it resists substantial deformation of the flexible interlayer material forming part of said assembly during said exposure to elevated temperature and pressure.

2. The method according to claim 1, wherein the interlayer material of said assembly contains a marginal portion extending beyond at least one of said rigid layers of transparent material.

3. The method according to claim 1, further including the step of separating the outer surface of the assembly from the inner surface of the inner layer of the bag by a parting material non-adherent to either the bag or the assembly and having a thickness of about .0005 inch.

4. The method according to claim 1, wherein said outer layer is of a material from the class consisting of condensation products of ethylene glycol and terephthalic acid and oil impervious nylon films and said inner layer is polyethylene having a specific gravity between about 0.916 and 0.93.

5. The method according to claim 1, wherein said assembly to be laminated comprises interlayer material of polyvinyl butyral and rigid sheets composed of glass.

6. The method according to claim 1, wherein the outer layer is composed of smooth, unstretched polyethylene glycol terephthalate and the inner layer is composed of polyethylene about .0035 inch thick, having a specific gravity of between 0.916 and 0.93 having passages about .002 inch deep at the inner surface thereof.

References Cited by the Examiner

UNITED STATES PATENTS

| | | | |
|---|---|---|---|
| 2,725,319 | 11/1955 | Tarnopol | 156—249 X |
| 2,778,171 | 1/1957 | Taunton | 53—9 |
| 2,783,176 | 2/1957 | Boicey | 156—286 |
| 2,947,415 | 8/1960 | Garth | 206—63.2 |
| 2,983,638 | 5/1961 | Quehl | 156—581 |
| 3,017,302 | 1/1962 | Hultkrans | 156—244 X |
| 3,188,265 | 6/1965 | Charbonneau et al. | 161—188 |

EARL M. BERGERT, *Primary Examiner.*

H. F. EPSTEIN, *Assistant Examiner.*

UNITED STATES PATENT OFFICE
CERTIFICATE OF CORRECTION

Patent No. 3,311,517　　　　　　　　　　　　　　March 28, 1967

Leroy D. Keslar et al.

It is hereby certified that error appears in the above numbered patent requiring correction and that the said Letters Patent should read as corrected below.

Column 7, line 14, before "layer" insert -- outer --.

Signed and sealed this 20th day of August 1968.

(SEAL)
Attest:

Edward M. Fletcher, Jr.　　　　　　　　　　　　　　EDWARD J. BRENNER
Attesting Officer　　　　　　　　　　　　　　　　　Commissioner of Patents